US012759009B2

(12) United States Patent
Han et al.

(10) Patent No.: US 12,759,009 B2
(45) Date of Patent: Oct. 13, 2026

(54) COATING DIE FOR LITHIUM SECONDARY BATTERY INCLUDING REMOVABLE SPACER SHIMS

(71) Applicant: LG Energy Solution, Ltd., Seoul (KR)

(72) Inventors: Yoonju Han, Daejeon (KR); Byoung Hoon Ahn, Daejeon (KR); Hyeong Geun Chae, Daejeon (KR); Hyunwoo Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 654 days.

(21) Appl. No.: 18/268,892

(22) PCT Filed: Oct. 12, 2022

(86) PCT No.: PCT/KR2022/015360
§ 371 (c)(1),
(2) Date: Jun. 21, 2023

(87) PCT Pub. No.: WO2023/063705
PCT Pub. Date: Apr. 20, 2023

(65) Prior Publication Data

US 2024/0050976 A1 Feb. 15, 2024

(30) Foreign Application Priority Data

Oct. 12, 2021 (KR) ........................ 10-2021-0135173

(51) Int. Cl.
*B05C 5/02* (2006.01)
*H01M 4/04* (2006.01)

(52) U.S. Cl.
CPC ......... *B05C 5/0254* (2013.01); *H01M 4/0404* (2013.01)

(58) Field of Classification Search
USPC .......................................... 118/410, 411, 412
See application file for complete search history.

(56) References Cited

U.S. PATENT DOCUMENTS

2013/0236651 A1 9/2013 Komatsubara et al.
2014/0154421 A1 6/2014 Komatsubara et al.
2019/0118449 A1* 4/2019 Greenlund ............ B29C 48/345
(Continued)

FOREIGN PATENT DOCUMENTS

CN 206688973 U 12/2017
CN 211026907 U 7/2020
CN 211964802 U 11/2020
(Continued)

OTHER PUBLICATIONS

English Translation of KR-20230028044A (Year: 2023).*
(Continued)

*Primary Examiner* — Yewebdar T Tadesse
(74) *Attorney, Agent, or Firm* — Lerner David LLP

(57) ABSTRACT

The present disclosure relates to a coating die for a lithium secondary battery.
The coating die includes an upper die plate, a lower die plate, and a shim assembly interposed between the upper die plate and the lower die plate.
The shim assembly includes a body shim and one or more spacer shims, and
the spacer shims are formed to be individually removable from the coating die such that the number and position of the spacer shims are adjustable.

10 Claims, 3 Drawing Sheets

(56) References Cited

U.S. PATENT DOCUMENTS

| | | | |
|---|---|---|---|
| 2019/0374971 | A1 | 12/2019 | Horinouchi et al. |
| 2022/0062944 | A1 | 3/2022 | Horinouchi et al. |

FOREIGN PATENT DOCUMENTS

| | | | | | |
|---|---|---|---|---|---|
| CN | 212113924 | U | | 12/2020 | |
| CN | 212136588 | U | | 12/2020 | |
| CN | 113083612 | A | | 7/2021 | |
| CN | 113130839 | A | | 7/2021 | |
| CN | 113275200 | A | | 8/2021 | |
| JP | 2001-029861 | A | | 2/2001 | |
| JP | 4565990 | B2 | | 10/2010 | |
| JP | 2013176748 | A | | 9/2013 | |
| JP | 5315453 | B1 | | 10/2013 | |
| JP | 2014-184351 | A | | 10/2014 | |
| JP | 6794473 | B2 | | 12/2020 | |
| JP | 2021010867 | A | | 2/2021 | |
| KR | 20130098758 | A | | 9/2013 | |
| KR | 2015-0045119 | A | | 4/2015 | |
| KR | 20170033087 | A | | 3/2017 | |
| KR | 20170094920 | A | | 8/2017 | |
| KR | 101801422 | B1 | | 11/2017 | |
| KR | 20190096114 | A | | 8/2019 | |
| KR | 102035826 | B1 | | 10/2019 | |
| KR | 20230028044 | A | * | 2/2023 | .......... H01M 4/0404 |

OTHER PUBLICATIONS

International Search Report for Application No. PCT/KR2022/015360 mailed Jan. 18, 2023. 4 pages.

Extended European Search Report including Written Opinion for Application No. 22881332.5 dated Jun. 11, 2024. 9 pgs.

Search Report dated Mar. 16, 2026 from the Office Action for Chinese Application No. 202280007740.0 issued Mar. 17, 2026, 2 pages.

* cited by examiner

【FIG. 1】
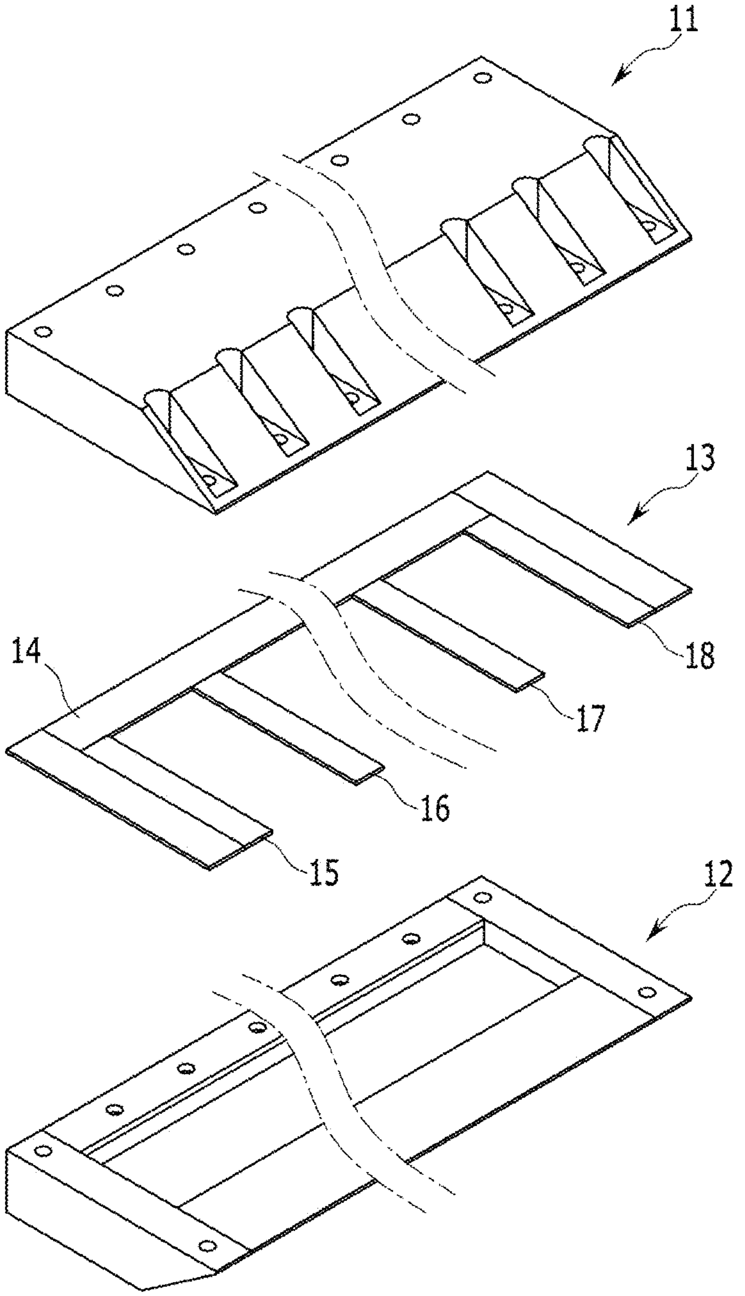
PRIOR ART

【FIG. 2】
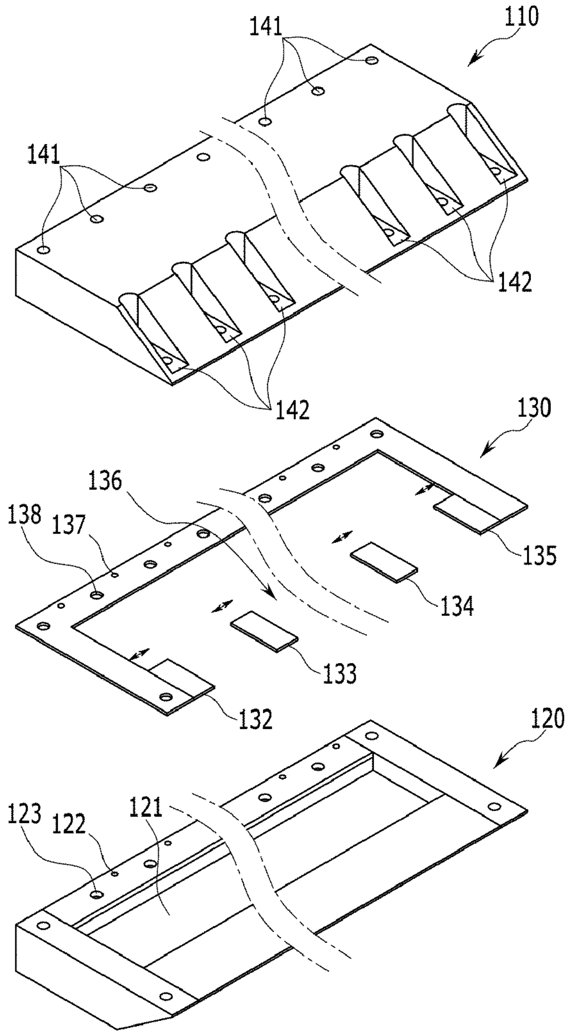
【FIG. 3】
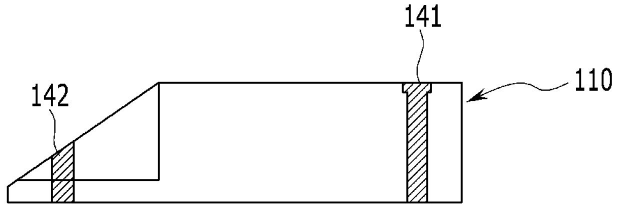

【FIG. 4】
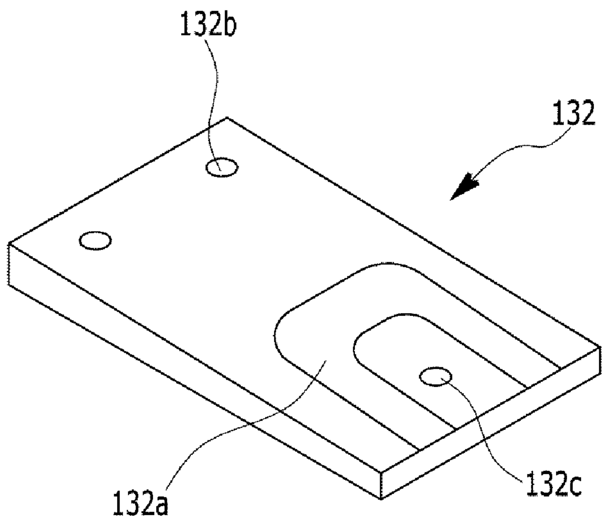

COATING DIE FOR LITHIUM SECONDARY BATTERY INCLUDING REMOVABLE SPACER SHIMS

CROSS-REFERENCE TO RELATED APPLICATIONS

This application is a national phase entry under 35 U.S.C. § 371 of International Application No. PCT/KR2022/015360 filed on Oct. 12, 2022, which claims the benefit of Korean Patent Application No. 10-2021-0135173 filed on Oct. 12, 2021 with the Korean Intellectual Property Office, all the contents of which are incorporated herein by reference.

TECHNICAL FIELD

The present disclosure relates to a coating die for lithium secondary battery including removable spacer shims

BACKGROUND

With the technology development and increased demand for mobile devices, demand for secondary batteries as energy sources has been rapidly increasing. Among such secondary batteries is a lithium secondary battery exhibiting a high energy density and operating voltage, a long cycle lifespan, and a low self-discharge rate, which is now commercialized and widely used.

Also, recently, as interest in environmental issues grows, studies are frequently conducted on an electric vehicle (EV), a hybrid electric vehicle (HEV), etc. which can replace a vehicle using fossil fuels such as a gasoline vehicle and a diesel vehicle, which are one of the main causes of air pollution. A lithium secondary battery having high energy density, discharge voltage and output stability is mainly studied and used as a power source for the electric vehicle (EV), the hybrid electric vehicle (HEV) and the like.

Such a lithium secondary battery is generally manufactured by stacking or winding electrodes of cathode and anode with a separator interposed therebetween, and incorporating them together with an electrolyte solution in a battery case.

Among them, electrodes such as the cathode and the anode are manufactured by applying, drying, and rolling an active material slurry on a current collector, wherein the application of the active material slurry is generally performed by a coating die that discharges the active material slurry.

At this time, a perspective view of the coating die is shown as an example in FIG. 1 below.

Referring to FIG. 1 below, such a coating die is composed of an upper coating die 11, a lower coating die 12, and a shim assembly 13 interposed therebetween, wherein the shim assembly 13 has a structure in which a body shim 14 for forming a connection between the upper coating die 11 and the lower coating die 12, and spacer shims 15, 16, 17 and 18 for discharging an insulating liquid are integrated.

However, recently, as the number of lanes for manufacturing electrodes increases and the width of metal foil used as a current collector increases, the integrated shim assembly shows many difficulties in the adjustment of individual slurry width, loading, and mismatch, and has problems with precision design and assembly of the spacer shims in simultaneously forming the insulating liquid and the active material slurry.

Therefore, there is a need to develop a technology that can solve the above problems.

DETAILED DESCRIPTION OF THE INVENTION

Technical Problem

It is an object of the present disclosure to provide a coating die for a lithium secondary battery having a novel structure that allows adjustment of the coating width, loading, and mismatch of an active material slurry or an insulating liquid for each lane as needed.

Technical Solution

According to one embodiment of the present disclosure, there is provided a coating die for a lithium secondary battery,

- the coating die comprising an upper die plate, a lower die plate, and a shim assembly interposed between the upper die plate and the lower die plate,
- wherein the shim assembly includes a body shim and one or more spacer shims, and
- wherein the spacer shims are formed to be individually removable from the coating die.

In one specific embodiment, the upper die plate may include an insulating liquid injection path into which an insulating liquid is injected.

Wherein, the insulating liquid injection path may be formed from an upper part to a lower part.

In one specific embodiment, the lower die plate is coupled to the upper die plate, and may include a slurry injection path into which the active material slurry is injected, and a manifold that stores the active material slurry, wherein the lower die plate is coupled to the upper die plate by a fixing pin, a fixing bolt, or both.

In one specific embodiment, the body shim is coupled with the upper die plate and the lower die plate, and may have an outlet port that is opened from the manifold toward the outside where the coating is performed and thus discharges the active material slurry stored in the manifold, so as not to cover the manifold formed on the lower die plate and storing the active material slurry.

Wherein, the body shim may be coupled to the upper die plate and the lower die plate by a fixing pin, a fixing bolt, or both.

In one specific embodiment, the spacer shims are individually coupled with the upper die plate, the lower die plate, or the upper die plate and the lower die plate, and may include an insulated flow passage that positioned so as to correspond to an insulating liquid injection path of the upper die plate, stores and discharges the insulating liquid injected from the injection path of the upper die plate.

Wherein, the spacer shims may be coupled with the upper die plate, the lower die plate, or the upper and lower die plates by a fixing pin, a fixing bolt, or both.

Further, the fixing pin and the fixing bolt are formed by a structure capable of coupling and removal, and thus, can be formed so that the spacer shims are removable from the coating die.

The spacer shims may consist of one or more numbers or may be included less than or equal to the number of insulating liquid injection paths formed on the upper die plate.

BRIEF DESCRIPTION OF THE DRAWINGS

FIG. 1 is a perspective view of a conventional coating die for a lithium secondary battery;

FIG. 2 is a perspective view of a coating die for a lithium secondary battery according to one embodiment of the present disclosure;

FIG. 3 is a cross-sectional view of the upper die plate of FIG. 1; and

FIG. 4 is a perspective view of the spacer shim of FIG. 1.

DETAILED DESCRIPTION OF THE EMBODIMENTS

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way. Accordingly, the embodiments described herein and the configurations shown in the drawings are only most preferable embodiments of the present disclosure and do not represent the entire spirit of the present disclosure, so it should be appreciated that there may be various equivalents and modifications that can replace the embodiments and the configurations at the time at which the present application is filed, and the scope of the present invention is not limited to the embodiments described below.

Hereinafter, the present disclosure will be described in detail with reference to the accompanying drawings.

According to one embodiment of the present disclosure, there is provided a coating die for a lithium secondary battery,

- the coating die comprising an upper die plate, a lower die plate, and a shim assembly interposed between the upper die plate and the lower die plate,
- wherein the shim assembly includes a body shim and one or more spacer shims, and
- wherein the spacer shims are formed to be individually removable from the coating die.

FIG. 2 is a perspective view of a coating die for a lithium secondary battery according to one embodiment of the present disclosure, FIG. 3 is a cross-sectional view of the upper die plate 110 of the coating die, and FIG. 4 is a perspective view of one spacer shim 132 of the coating die.

In one an example, the present disclosure will be described with reference to FIGS. 2 to 4 together.

Referring to FIG. 2, the coating die for a lithium secondary battery according to the present disclosure includes an upper die plate 110, a lower die plate 120, and a shim assembly 130 interposed between the upper die plate 110 and the lower die plate 120, wherein the shim assembly 130 includes a body shim 131 and one or more spacer shims 132, 133, 134 and 135.

More specifically, the upper die plate 110 includes coupling holes 141 into which fixing pins, fixing bolts, or both for coupling with the lower die plate 120 are inserted, and insulating liquid injection paths 142 into which an insulating liquid is injected.

Referring to FIG. 3 together with FIG. 2, the insulating liquid injection path 142 is formed from the upper part to the lower part and is formed so as to pass through the upper die plate 110, which makes it possible to inject the insulating liquid into the spacer shims 132, 133, 134 and 135 through the insulating liquid injection paths 142.

The coupling hole 141 is formed for coupling between the body shim 131 and the lower die plate 120, which will be described later.

Meanwhile, the lower die plate 120 includes a slurry injection path into which the active material slurry is injected (not shown in the figure), and a manifold 121 that stores the active material slurry.

Here, the slurry injection path has a structure that is connected to the manifold 121. Therefore, the active material slurry injected from the slurry injection path reaches the manifold 121 and is stored.

The active material slurry stored in the manifold 121 performs electrode coating in the form of being discharged from the outlet port 136 of the body shim 131 of the shim assembly 130 of the coating die in an assembled state, which will be described later.

For this purpose, the lower die plate 120 is coupled to the upper die plate 110, wherein since it can be coupled by a fixing pin, a fixing bolt, or both, and the lower die plate 120 can also include coupling holes 122 and 123 that can be coupled with the upper die plate 110.

As a component of the shim assembly 130, the body shim 131 has an outlet port 136 that is opened from the manifold 121 toward the outside where the coating is performed and thus discharges the active material slurry stored in the manifold 121, so as not to cover the manifold 121 formed on the lower die plate 120 and storing the active material slurry.

As described above, the active material slurry stored in the manifold 121 is discharged through the outlet port 136.

That is, the body shim 131 simply has a 'ㄷ' shape.

Further, the body shim 131 is coupled with the upper die plate 110 and the lower die plate 120. At this time, the coupling of the body shim 131 may also be formed by a fixing pin, a fixing bolt, or both, and thus, the body shim 131 may include coupling holes 137 and 138 into which they can be inserted.

Meanwhile, the spacer shims 132, 133, 134 and 135 included in the coating die 100 of the present disclosure are configured to be individually removable.

Specifically, the spacer shims 132, 133, 134 and 135 are individually coupled with the upper die plate 110, the lower die plate 120, or the upper die plate 110 and the lower die plate 120.

In order to be individually removable, the spacer shims 132, 133, 134 and 135 can be coupled to the upper die plate 110, the lower die plate 120, or the upper die plate 110 and the lower plate 120 by a fixing pin, a fixing bolt, or both.

Here, the fixing pin and the fixing bolt are formed by a structure capable of coupling and removal, so that the spacer shims 132, 133, 134 and 135 are formed to be removable from the coating die 100.

At this time, the spacer shims 132, 133, 134 and 135 may be formed at any position corresponding to the insulating liquid injection path 142 of the die upper die plate 110, and the width and formation position thereof can be appropriately selected as needed.

Further, since the number of spacer shims 132, 133, 134 and 135 used can also be selected, the spacer shims may consist of one or more numbers or may be included less than or equal to the number of insulation liquid injection paths formed on the upper plate of the die. Specifically, it is preferable that the number of spacer shims is 1 or more, specifically 2 or more, and more specifically 3 or more.

Therefore, according to the present disclosure, the spacer shims 132, 133, 134 and 135 is individually removable from the coating die 100, and the number and position of each can be changed, thus enabling adjustment of the coating width, loading, and mismatch between active material slurry and insulating liquid.

In order to show the specific structure of these spacer shims 132, 133, 134 and 135, FIG. 4 schematically shows a perspective view of one of these spacer shims 132.

Referring to FIG. 4, the spacer shim 132 includes coupling holes 132*b* and 132*c* for coupling with the upper die plate 110 and/or the lower die plate 120.

Further, the spacer shims 132, 133, 134 and 135 specifically serve to coat the insulating liquid. Therefore, the spacer shims 132, 133, 134 and 135 include an insulating flow passage 132*a* through which the insulating liquid injected from the insulating liquid injection path 142 of the die upper die plate 110 is discharged to the outside of the coating die 100.

Therefore, the active material slurry of the manifold 121 of the lower die plate 120 is discharged and coated by the outlet port 136 of the body shim 131, and the insulating liquid is discharged and coated through the insulating flow passages 132*a* of the spacer shims 132, 133, 134 and 135.

Therefore, simultaneous coating of the active material slurry and the insulating liquid is possible.

Any person who has ordinary knowledge in the field to which the present disclosure pertains can make various applications and modifications within the scope of the present invention based on the above contents.

INDUSTRIAL APPLICABILITY

A coating die for a lithium secondary battery according to the present disclosure has a removable spacer shim that discharges the insulating liquid, and has an effect of enabling adjustment of the coating width, loading, and mismatch of the active material slurry and the insulating liquid, if necessary.

The invention claimed is:

1. A coating die for a lithium secondary battery,
the coating die comprising an upper die plate, a lower die plate, and a shim assembly interposed between the upper die plate and the lower die plate,
wherein the shim assembly includes a body shim and one or more spacer shims,
wherein the one or more spacer shims are formed to be individually removable from the coating die, and
wherein the one or more spacer shims are individually coupled with the upper die plate, the lower die plate, or the upper die plate and the lower die plate, and include an insulated flow passage that positioned so as to correspond to an insulating liquid injection path of the upper die plate, stores and discharges the insulating liquid injected from the injection path of the upper die plate.

2. The coating die according to claim 1, wherein:
the upper die plate includes an insulating liquid injection path into which an insulating liquid is configured to be injected.

3. The coating die according to claim 2, wherein:
the insulating liquid injection path is formed from an upper part to a lower part.

4. The coating die according to claim 1, wherein:
the lower die plate is coupled to the upper die plate, and includes a slurry injection path into which the active material slurry is configured to be injected, and a manifold that is configured to store the active material slurry.

5. The coating die according to claim 4, wherein:
the body shim is coupled with the upper die plate and the lower die plate, and has an outlet port that is opened from the manifold toward the outside where coating is performed and thus is configured to discharge the active material slurry stored in the manifold, so as to not cover the manifold formed on the lower die plate storing the active material slurry.

6. The coating die according to claim 1, wherein:
the lower die plate is coupled to the upper die plate by a fixing pin, a fixing bolt, or both.

7. The coating die according to claim 1, wherein:
the body shim is coupled to the upper die plate and the lower die plate by a fixing pin, a fixing bolt, or both.

8. The coating die according to claim 1, wherein:
the one or more spacer shims are coupled with the upper die plate, the lower die plate, or the upper and lower die plates by a fixing pin, a fixing bolt, or both.

9. The coating die according to claim 8, wherein:
the fixing pin and/or the fixing bolt are formed by a structure capable of coupling and removal, and thus, are formed so that the one or more spacer shims are removable from the coating die.

10. The coating die according to claim 1, wherein:
a number of the one or more spacer shims is less than or equal to a number of insulating liquid injection paths formed on the upper die plate.

* * * * *